(12) United States Patent
Loeliger et al.

(10) Patent No.: US 10,402,251 B2
(45) Date of Patent: Sep. 3, 2019

(54) DMA CONTROLLER FOR A DATA PROCESSING SYSTEM, A DATA PROCESSING SYSTEM AND A METHOD OF OPERATING A DMA CONTROLLER

(71) Applicant: FREESCALE SEMICONDUCTOR, INC., Austin, TX (US)

(72) Inventors: Jeffrey Thomas Loeliger, Glasgow (GB); Filippo Cioni, East Kilbride (GB)

(73) Assignee: NXP USA, Inc., Austin, TX (US)

( * ) Notice: Subject to any disclaimer, the term of this patent is extended or adjusted under 35 U.S.C. 154(b) by 308 days.

(21) Appl. No.: 14/808,088

(22) Filed: Jul. 24, 2015

(65) Prior Publication Data

US 2017/0024270 A1 Jan. 26, 2017

(51) Int. Cl.
*G06F 11/00* (2006.01)
*G06F 11/07* (2006.01)
*G06F 13/28* (2006.01)
*G06F 13/32* (2006.01)
*G06F 13/42* (2006.01)
*G06F 11/30* (2006.01)
*G06F 11/14* (2006.01)

(52) U.S. Cl.
CPC ...... *G06F 11/0772* (2013.01); *G06F 11/0745* (2013.01); *G06F 11/141* (2013.01); *G06F 11/3027* (2013.01); *G06F 13/28* (2013.01); *G06F 13/32* (2013.01); *G06F 13/4282* (2013.01)

(58) Field of Classification Search
CPC .. G06F 11/0772; G06F 13/4282; G06F 13/28; G06F 13/32; G06F 11/08; G06F 11/141; G06F 11/3027
USPC .......................................................... 714/49
See application file for complete search history.

(56) References Cited

U.S. PATENT DOCUMENTS

| | | | | |
|---|---|---|---|---|
| 5,166,872 A | * | 11/1992 | Weaver | G05B 19/052 700/4 |
| 5,245,347 A | * | 9/1993 | Bonta | G01S 7/2813 342/149 |
| 5,712,436 A | * | 1/1998 | Sakama | G10H 1/36 84/610 |
| 6,263,396 B1 | * | 7/2001 | Cottle | G09G 5/14 348/E11.021 |
| 6,766,317 B2 | | 7/2004 | Sharma et al. | |
| 6,993,291 B2 | | 1/2006 | Parssinen et al. | |
| 2005/0248477 A1 | | 11/2005 | JongSma et al. | |

(Continued)

*Primary Examiner* — Yair Leibovich

(57) ABSTRACT

The present application relates to a direct memory access, DMA, controller for a data processing system and a method of operating the DMA controller is provided. The DMA controller comprises a transfer table, a data path processing block and a comparator logic block. The table comprises at least one transfer descriptor comprising information about a source and destination of a DMA transfer. The data path processing block is provided to be coupled to a system interconnect of the data processing system and configured to receive data from the source of the DMA transfer and to transfer the received data to the destination of the DMA transfer. The comparator logic block is configured to validate the value of the received data against a predefined value range for range checking and to initiate one or more failed range check actions in response to a failed range checking.

20 Claims, 7 Drawing Sheets

(56) References Cited

U.S. PATENT DOCUMENTS

| | | | |
|---|---|---|---|
| 2006/0143509 A1* | 6/2006 | Okawa | G06F 11/004 714/11 |
| 2009/0141141 A1* | 6/2009 | Onozawa | G03B 13/36 348/222.1 |
| 2010/0142291 A1* | 6/2010 | Joo | G06F 1/206 365/189.15 |
| 2013/0080863 A1* | 3/2013 | Hida | H03M 13/1525 714/784 |
| 2013/0185096 A1* | 7/2013 | Giusti | G06Q 50/24 705/3 |
| 2015/0127867 A1* | 5/2015 | Takahashi | G06F 13/24 710/269 |

\* cited by examiner

DMA CONTROLLER FOR A DATA PROCESSING SYSTEM, A DATA PROCESSING SYSTEM AND A METHOD OF OPERATING A DMA CONTROLLER

FIELD OF THE INVENTION

The present disclosure relates generally to a data processing system and in particular to a direct memory access, DMA, controller thereof.

BACKGROUND

Integrated circuit devices are used today in a broad variety of control applications, which include safety critical use cases. Any fault, which occurs in the integrated circuit device, which forms part of a safety critical system or controls components of a safety critical system, could lead to a dangerous situation. For example, an erroneous sensor input to a safety critical system power could result in injury or harm of a user of another person. Safety critical systems such as may be found in transportation systems such as avionic systems, automotive systems and the like, may not be inherently fault-tolerant to erroneous data. In such cases, additional safety circuitry may be employed by these systems which, in the event of erroneous data due to erroneous sensor input values for example, respond in a way that at least minimizes the risk of damage to the system or harm to a user and/or other persons within the sphere of activity of the safety critical system (and the apparatus under control thereof). Such safety circuits may in themselves be system on chip devices, sometimes called "failsafe circuits" or "failsafe machines" comprising various functionalities and/or functional circuits or modules such as monitoring circuitry, fault detection circuits, fault reporting circuitry and failsafe backup operation modes.

Although the safety requirements are one main aspect to be met by safety critical systems, the increasing complexity of applications carried out in safety critical systems has also to be considered. In particular, there is a need for a resource and computing power efficient verification of input data to applications of safety critical systems.

SUMMARY

The present invention provides a direct memory access, DMA, controller for a data processing system, a data processing system with a direct memory access, DMA, controller, and a method of operating the direct memory access, DMA, controller as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION

Figure 1:
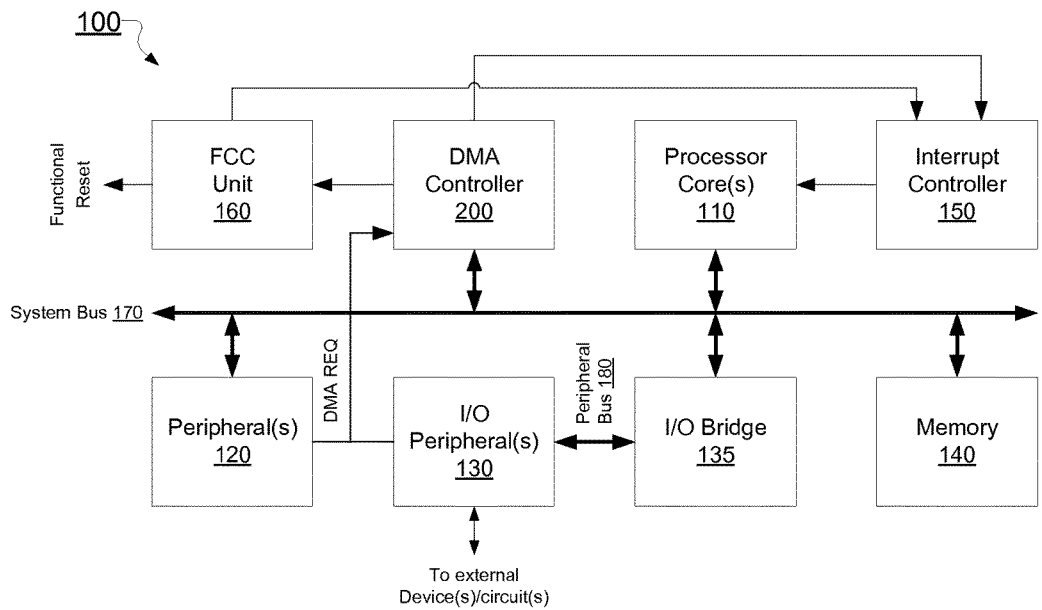
FIG. 1 schematically illustrates a block diagram of a data processing system including a direct memory access, DMA, controller according to an example of the present invention.

Embodiments of the present disclosure will be described below in detail with reference to drawings. Note that the same reference numerals are used to represent identical or equivalent elements in figures, and the description thereof will not be repeated. The embodiments set forth below represent the necessary information to enable those skilled in the art to practice the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

FIG. 1 illustrates, schematically, in block diagram form, a data processing system 100 in accordance with an example of the present invention. In an example, the data processing system 100 is implemented on a single integrated circuit die (System-on-Chip, SoC). In other examples, data processing system may be implemented on more than one integrated circuit die. The integrated circuit die may be implemented in a common package (System-in-Package, SiP). The block diagram shown in FIG. 1 may be understood as an exemplary microcontroller architecture.

The data processing system 100 includes at least one processor core 110, at least one direct memory access, DMA, controller 200, a set of one or more peripherals 120, a set of one or more I/O peripherals 130 and a data memory 140, in particular a random access memory. The example data processing system schematically illustrated in FIG. further comprises an interrupt controller 150 and a failure collection and correction, FCC, unit 160. The data processing system 100 further comprises a system interconnect or bus 170, to which components of the data processing system 100 are coupled to allow for bi-directionally exchange of data with each other. The system interconnect or bus 170 may be one of a variety of systems for interconnecting each of the components with each other and in particular the one or more processor cores 110. System interconnect or bus 170 may be, for example, a system bus, a cross-bar switch, or the like. The set of one or more I/O peripherals 130 are coupled to the system interconnect or bus 170 via a I/O bridge 135, to which the set of one or more I/O peripherals 130 is coupled through a peripheral bus 180 and which interfaces the communication with the set of one or more I/O peripherals 130.

Each of the set of one or more I/O peripherals 130 includes one or more ports and/or a plurality of terminals for receiving signal inputs from and/or for uni-directionally or bi-directionally communicating data with other one or more devices or circuits external to data processing system 100.

The set of one or more I/O peripherals 130 may comprise, for example, an analog-to-digital converter, a UART (universal asynchronous receiver/transmitter), a serial/parallel interface, controller area network (CAN), or other modules that add functionality to data processing system 100. Frequently, data of a peripheral is to be moved to memory or another peripheral. The DMA controller 200 is included to remove some of the processing burden from processor cores 110 due to data transfers between peripherals 120, 130 and memory 140. Note that memory 140 may be also understood as a peripheral in the context of the present application.

Direct memory access (DMA) data transfers are commonly used in data processing systems to transfer data from various modules in the data processing system with minimal involvement of the processor core 110. Direct memory access (DMA) is a feature that allows hardware subsystems within the data processing system 100 to access system memory for reading and/or writing independently of the processor core 110. Otherwise, the processor core 110 would have to copy each piece of data from the source to the destination. This is typically slower than copying normal blocks of memory since access to in particular I/O peripherals 130 over the peripheral bus 180 is generally slower than system memory 140. During this time the processor core 110 would be unavailable for other tasks involving CPU bus access, although it could continue doing any work which did not require bus access.

In a typical DMA transfer between, for example, a peripheral and a memory, initiation of the transfer may be controlled by the peripheral 120, 130 or the at least one processor core 110 via a DMA transfer request sent by the DMA transfer initiating instance (e.g. the peripheral 120, the peripheral 130 or the at least one processor core 110) to the DMA controller 200. The DMA controller 200 may queue the received DMA transfer requests and perform the queued DMA transfer requests in a predefined order. Such a DMA transfer request comprises the source and the destination of the data to be transferred by the DMA controller 200. The data processing system 100 includes may include a plurality of DMA controllers each performing independently DMA transfers within the data processing system 100 provided there are no conflicts due to shared hardware use and hardware use restrictions.

The interrupt controller 150 of the data processing system 100 enables components thereof to indicate and/or report status, exception or error information to the at least one processor core 110, at which an appropriate interrupt service routine, ISR, is executed in response to a received interrupt signal. The interrupt controller 150 may buffer and prioritize the received interrupt signal before forwarding to the at least one processor core 110.

The fault collection and control unit (FCCU) 160 is provided to collect faults information and to initiate appropriate actions in response to the collected fault information. In particular, the fault collection and control unit (FCCU) 160 is arranged to trigger a functional reset, to issue an interrupt signal and/or to bring the data processing system 100 to into a safe state in response to failures signalized by alarm signals to the fault collection and control unit (FCCU) 160. The fault collection and control unit (FCCU) 160 may be programmable to initiate selective actions in response to different alarm signals.

For the sake of completeness it should be noted that each of peripherals 120 and 130 and DMA controller 200 can generate an interrupt request to interrupt controller 150. In response to interrupt requests, the interrupt controller 150 asserts processor interrupt request PIR to the one or more processor cores 110. The interrupt request is used to notify the processor cores 110 of certain events. For example, the DMA controller 200 may generate an interrupt to notify the processor core 110 that a DMA transfer has been completed.

Figure 2:
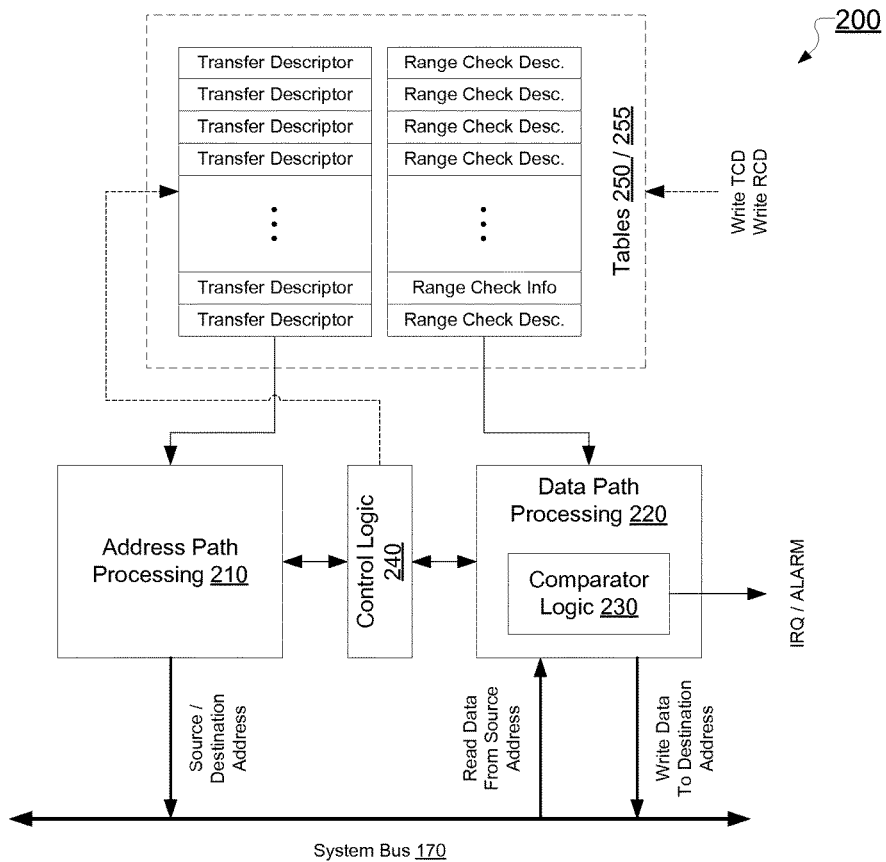
FIG. 2 schematically illustrates a block diagram of a direct memory access, DMA, controller according to an example of the present invention.

Referring now to FIG. 2, a DMA controller according to an example of the present application is schematically illustrated.

The DMA controller 200 comprises an address path processing block 210, a data path processing block 220, a control logic block 240 and one or more tables 250, herein a transfer table 250 comprising transfer descriptors and a range check table 255 comprising range check descriptors. Each of the tables 250, 255 comprise a list of descriptors.

A transfer descriptor relates to configuration and control settings for the DMA controller 200 to perform a DMA transfer. The transfer descriptor includes information for the DMA controller 200 to perform a requested DMA transfer for data from the source to a destination. Hence, a transfer descriptor comprises at least address information about the source and destination of the data to be transferred by the DMA controller 200. In particular, a transfer descriptor comprises a source address and a destination address. A transfer descriptor may comprise further DMA transfer related information, e.g. a data size information, transfer mode information and information relating enhanced DMA transfer operations such as 1-D or 2-D DMA transfers and the like.

A range check descriptor relates to control parameters and values for the DMA controller 200 to perform a validation of the value of the data transferred from the source to the destination and to control one or more actions at the DMA controller 200 in response to the validation result.

In a read phase of a DMA transfer, the address path processing block 210 is provided to generate a source address on the basis of the source defined in a transfer descriptor for reading the data at the source and issues a data read request including the generated source is issued by the DMA controller 200 to the system bus 170 of the data processing system 100 to read the data at the source address specified in the data read request.

In response to the data read request a request response is received at the DMA controller 200. The request response comprises the requested data of the source.

The data path processing block 220 is provided to receive the source data. The data path processing block 220 may comprise a transfer buffer to temporarily store the source data included in the request response.

In a write phase of the DMA transfer, the address path processing block 210 is further provided to generate a destination address on the basis of the corresponding destination defined in the respective transfer descriptor for writing the source data to the destination address and a data write request including the generated and the source data is issued by the DMA controller 200 to the system bus 170 of the data processing system 100 to write the source data to the destination address specified in the write data request.

In an example of the present application, the data path processing block 220 comprises a comparator logic block 230, which is configured to verify the received source data before writing the source data to the destination in a verification or check phase interposed between read phase and write phase of the DMA transfer.

The comparator logic block 230 is arranged to perform a range check of the received source data with respect to at least one predefined threshold comprising at least one of an upper range limit and a lower range limit. The range check determines whether the value of the source data is within a predetermined range of permissible values.

It should be noted that the value of the received source data will be denoted as "source value" for the sake of explanation. Further, if the source value is within the predetermined range of permissible values, the source value will be denoted as "valid (source) value" and, otherwise, if the source value is not within (outside of) the predetermined permissible range, the source value will be denoted as "invalid (source) value".

The range check determines whether the source value exceeds the predefined upper range limit and/or falls below the predefined lower range limit. Accordingly, the range check is configured to perform at least one comparison operation in order to a check the source value against a predefined range defined by at least one of an upper and a lower range limit. In an example of the present application, one of an upper limit or a lower limit defines a one-sided open interval and an upper limit as well as a lower limit define a closed interval.

Figure 3:
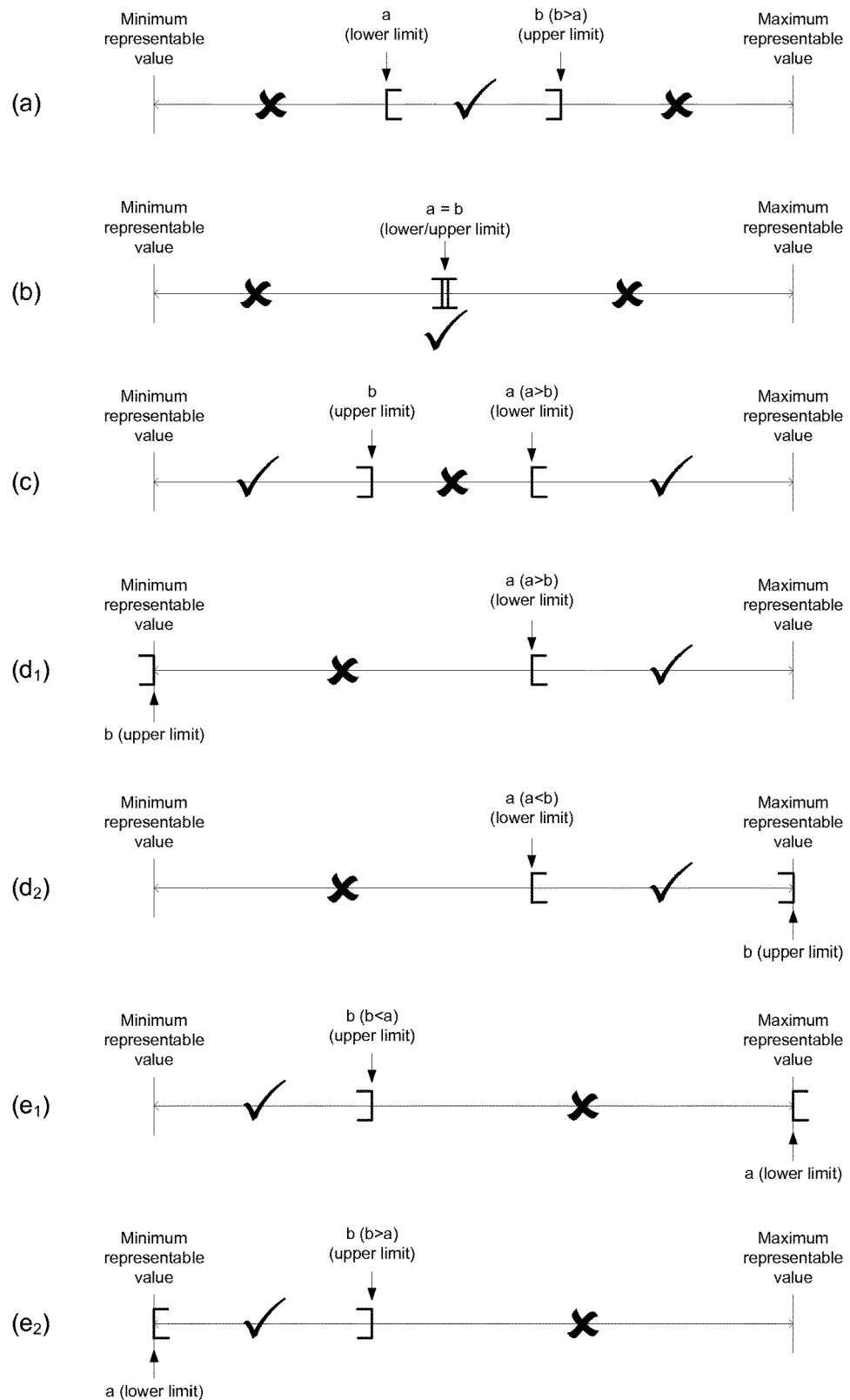
FIG. 3 shows various number line diagrams schematically illustrating the range checking and validation of a value of source data at a direct memory access, DMA, controller according to an example of the present invention.

For the sake of completion, it should be noted that the representable values of numerical values in data processing systems is limited to a predefined range due to representation format and encoding in memory. The aforementioned range check is illustratively shown in FIG. 3 on the basis of different value ranges each defined by a set of a lower limit a and an upper limit b. The depictions (a) through (e) substantially self-explanatory. The value domains of valid values are indicated by the symbol "✓" ("OK" or "hook" symbol) and the value domains of invalid values are indicated by the symbol "x" ("cancel" or "cross" symbol). The value domains of valid values will be denoted as valid domains and the value domains of invalid values will be denoted as invalid domains in the following.

The at least one of an upper limit and a lower limit are comprised by a range check descriptor, which may be associated with or comprised in the transfer descriptor of the DMA transfer.

The address path processing block 210 and the data path processing block 220 are operated under control of the control logic block 240. The information required to perform a DMA transfer may be entry-wise fetched from the table 250. The look-up table 250 comprises a list of transfer descriptors each representing an entry comprising configuration and control settings of a DMA transfer. The transfer descriptors of the list may be fetched from the table 250 in a defined order.

The comparator logic block 230 is further configured to initiate one or more conditional actions based on the result of the range check of the value of the received data. Various exemplary conditional actions will be described below with reference to FIG. 7.

Various exemplary table implementations of the transfer table 250 and/or the range check table 255 are schematically illustrated with reference to FIGS. 4 to 6.

Figure 4:
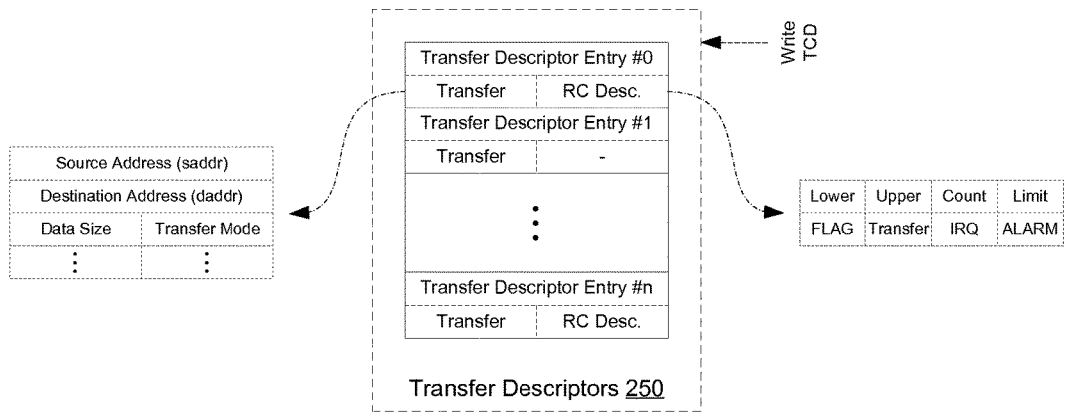
FIG. 4 to FIG. 6 schematically illustrate exemplary table implementations of a transfer table 250 and/or a range check table 255 for operating a direct memory access, DMA, controller according to an example of the present invention.

Referring now to FIG. 4, an example of the present application showing an integrated transfer and range check table comprising transfer descriptors and range check descriptors is schematically illustrated. The integrated transfer and range check table 250 comprises a list of transfer descriptors, each of which further includes selectively none, one or more range check descriptors in addition to the information relating to the DMA transfer.

As aforementioned, a transfer descriptor (TCD) comprises configuration and control settings for a DMA transfer; in particular source and destination addresses or address related information, base on which the source and destination addresses are determinable by the DMA controller 200.

A range check descriptors (also denoted as RCD) comprises control parameters and values relating to a range check of a source value of a DMA transfer against a predetermined range. In particular, the control parameters and values comprise a range information, which is for instance defined on the basis of at least one of a lower limit and an upper limit of the value range. The control parameters and values may further relate to the one or more actions performed in response to a failed range check, i.e. in case the source value is invalid. The control parameters and values may comprise at least one of a re-writable count value for counting failed range checks, a count limit defining a maximum number of failed range checks, a flag setting for instructing to include selectively a failure flag into the source data, a transfer setting for instructing to cancel selectively the DMA transfer, IRQ parameters used for generating and signaling an IRQ and alarm parameters used for generating and signaling an alarm. It should be noted that the control parameters and values comprised by a range check descriptor and the failed range check actions configured on the basis thereof and performed based thereon will be understood more fully when reading the description below.

The range check by the DMA controller 200 is performed if a transfer descriptor includes at least a range check descriptor. An omitted range check descriptor indicates to the DMA controller 200 and the control logic block 240 thereof that the range check operation is to be skipped.

Figure 5:
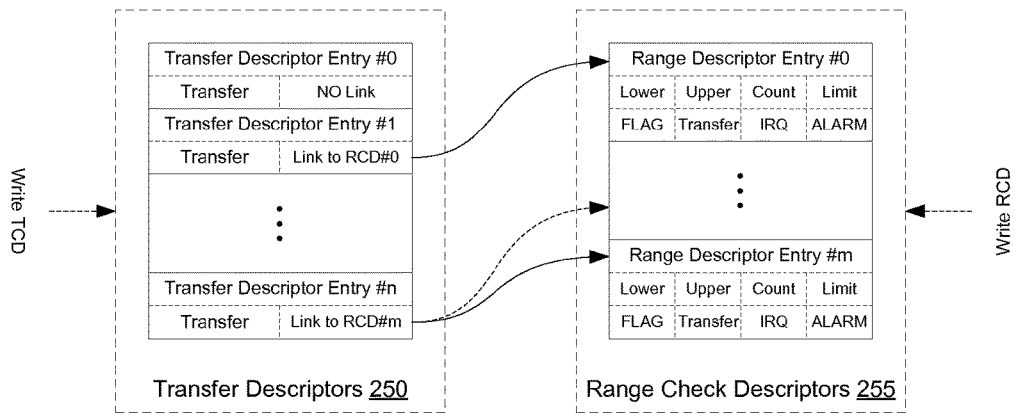

The example of the present application shown in FIG. 5 schematically illustrates a transfer table 250, which comprise a list of transfer descriptors, and a separate range check table 255, which comprise a list of range check descriptors. Each transfer descriptor includes selectively none, one or more link. Each link refers to one check range descriptor. The range check by the DMA controller 200 is performed if a link is comprised in a transfer descriptor, which refers to one or more valid range check descriptors. An omitted link, an invalid link or a link to an empty check range descriptor indicates to the DMA controller 200 and the control logic block 240 thereof that the range check operation is to be skipped.

Figure 6:
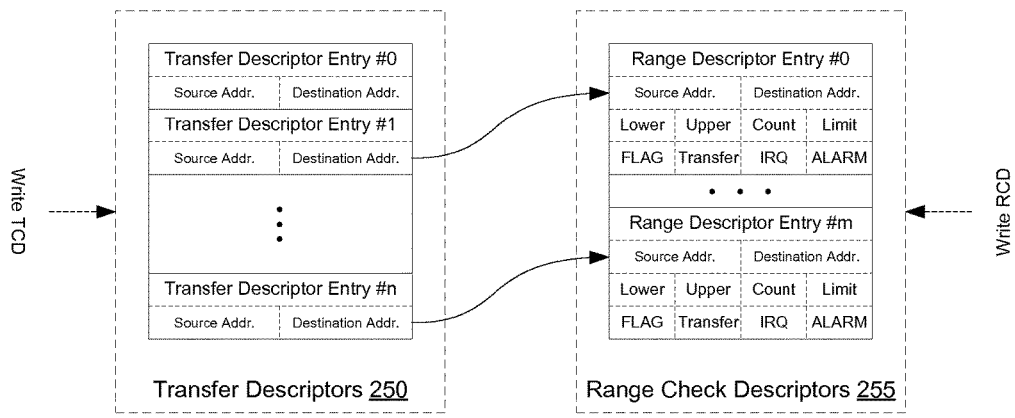

The example of the present application shown in FIG. 6 schematically illustrates a transfer table 250, which comprise a list of transfer descriptors, and a separate range check table 255, which comprise a list of range check descriptors. The check range descriptors are associated with the transfer descriptors through address information. Each range check descriptor may further comprise source and/or destination address information. In order to retrieve one or more check range descriptors for a DMA transfer to be performed in accordance with the information included in a transfer descriptor, the address information of the transfer descriptor is compared with the address information of the range check descriptors in the range check table 255.

The range check by the DMA controller 200 is performed if the address information of the transfer descriptor and the address information of one or more range check descriptors match. For instance, one or more range check descriptors may comprise a source address information: the one or more range check descriptors are considered to be associated with transfer descriptors comprising the corresponding source address information. For instance, one or more range check descriptors may comprise a destination address information: the one or more range check descriptors are considered to be associated with transfer descriptors comprising the corresponding destination address information. For instance, one or more range check descriptors may comprise a source and destination address information: the one or more range check descriptors are considered to be associated with transfer descriptors comprising the corresponding source and destination address information.

The transfer table 250 and the range check table 255 may be configurable separately. The transfer table 250 may be configured through DMA transfer requests initiated for instance by a peripheral 120 or 130 or may be received from a processing core 110 of the data processing system 100. The transfer descriptors may be cancelled once the DMA transfer performed on the basis of which is completed. The range check table may be separately configured through range check descriptor write requests received for instance from a software application executed on the data processing system. A range check descriptor may be maintained in the range check table to be retrieved in response to several DMA transfers performed on the basis of various transfer descriptors associated therewith.

One or more control values in a range check descriptor stored in the range check table 255 may be re-writeable. The DMA controller 200 and the comparator logic block 230 thereof may re-write the control values in a range check descriptor with status information relating to a DMA transfer from a predefined source and/or to a predefined destination. A control value for instance reflects a number of DMA transfers with invalid source values. The control value may be re-written each time an invalid source value is detected by the comparator logic block 230.

Figure 7:
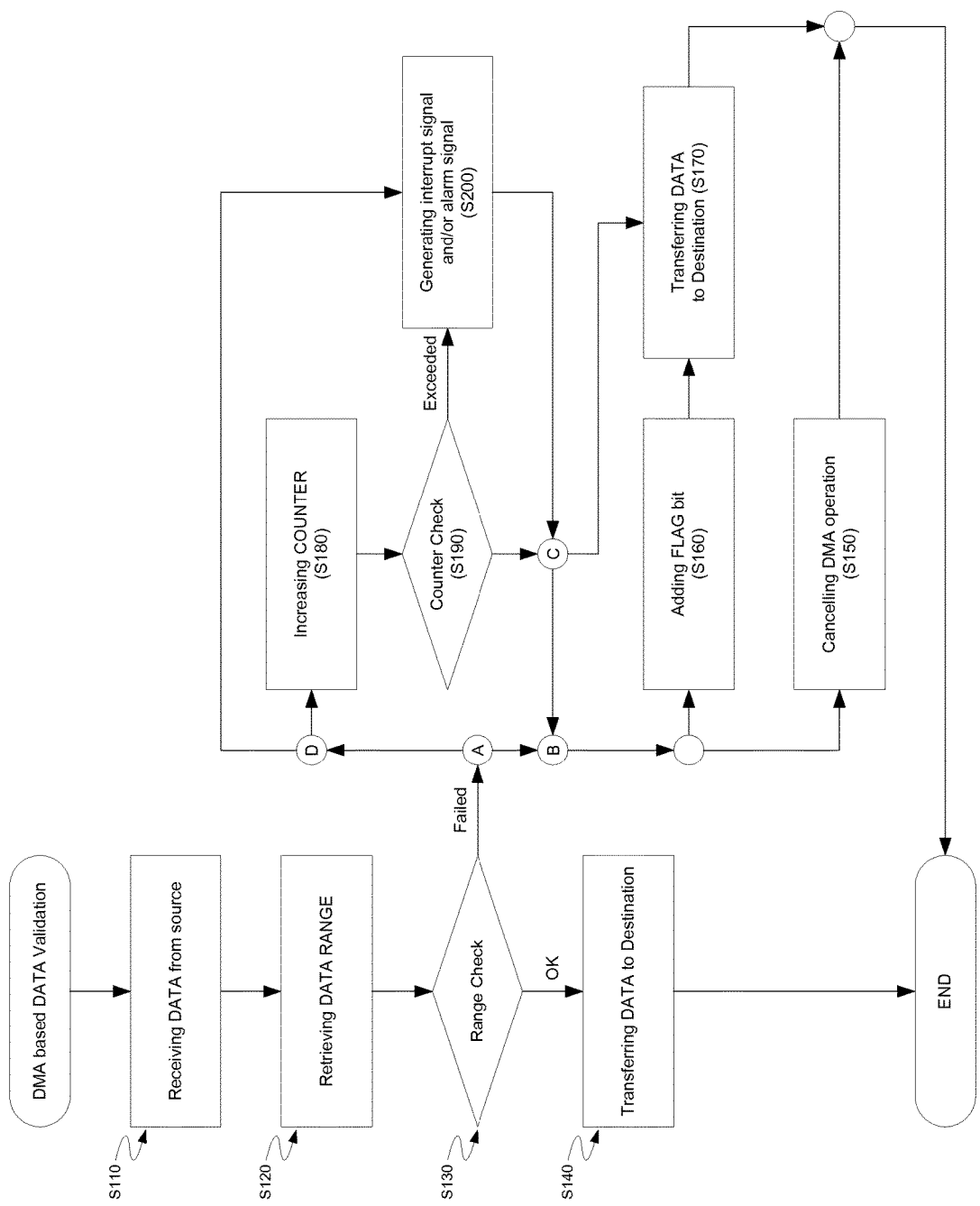
FIG. 7 schematically illustrates a flow diagram relating to the operation of the direct memory access, DMA, controller of FIG. 2 according to an example of the present invention.

Referring now to FIG. 7, a flow diagram of the operations performed at a comparator logic block 230 arranged in the data path processing block 220 of a DMA controller 100 is further schematically illustrated. Those skilled in the art will understand that the following description exemplifies the functionality of the comparator logic block 230. Those skilled in the art will further understand that the following description address the validation or check phase and the write phase of a DMA transfer.

At a stage S110, the source data of a current DMA transfer is received from the source in a request response at the data path processing block 220. The current DMA transfer is performed based on DMA transfer configuration and control settings described above with reference to a transfer descriptor.

At a stage S120, range information associated with the current DMA transfer is retrieved. The range information relates to a predetermined range of permissible values of the value of the received source data. In particular, the range information comprises at least one of an upper limit and a lower limit. The range information may be comprised in or may be associated with the configuration and control settings of the current DMA transfer. The range information may be part of control parameters and values comprised in a range check descriptor.

At a stage S130, the source value is validated against the range information at the comparator logic 230 of the data path processing block 220. In particular, the comparator logic 230 determines whether the source value is within the range of permissible values defined by the range information. The source value is compared with at least one of the upper limit and the lower limit to determine whether the source value exceeds the upper limit and/or falls below the lower limit.

In case the validation reveals that the range check is successfully passed, in particular that the source value is within the predetermined range defined by the range information, i.e. the source value is valid, the operational flow commences with stage S140.

In case the validation reveals that the range check has failed, in particular that the source value is outside the predetermined range defined by the range information, i.e. the source value is invalid, the operational flow commences with one or more check range failed operations as exemplified with stages S150 to S200.

In response to a failed check range, the DMA transfer may cancelled at stage S150. Accordingly, the data received at the data path processing block is discarded without asserting a data write request addressing the destination of the DMA transfer. The write phase of the current DMA transfer is skipped.

In response to a failed check range, a flag may be included into the received data at a stage S160. The flag may comprise one or more bits. The flag indicates that the received data failed to pass the check range validation. At a stage S170, the modified data is transferred by the DMA controller in a data write request to the destination in the write phase of the current DMA transfer.

In response to a failed check range, the DMA transfer may be commenced with a data write request including the received data to the destination at a stage S170.

A count value may be further provided, which is associated with the current DMA transfer. In particular, the count value is associated with the source and/or destination of the current DMA transfer. More particularly, the count value may be comprised in a check range descriptor associated with the transfer descriptor and the current DMA transfer, respectively.

In response to a failed check range, the count value is increased at a stage S180. The count value reflects a counter relating to the number of failed range checks with respect to DMA transfers from a specific source and/or to a specific destination.

At a stage S190, it is determined whether the count value exceeds a predefined count limit. The count limit is associated with the current DMA transfer. In particular, the count limit is associated with the source and/or destination of the current DMA transfer. More particularly, the count limit may be comprised in a check range descriptor associated with the transfer descriptor and current DMA transfer, respectively.

Alternatively, a ratio of the count value representing the failed range checks and the overall number of DMA transfers from a specific source and/or to a specific destination may be compared with the predefined count (ratio) limit, at the stage S190. The count check based on such a ratio enables to evaluate a ratio of the failed range checks. The overall number of DMA transfers from a specific source and/or to a specific destination is registered in a total transfer count value, which is associated with the source and/or destination of the current DMA transfer. More particularly, the total transfer count value may be comprised in a check range descriptor associated with the transfer descriptor and current DMA transfer, respectively.

In an example of the present application, the count value is provided to count the number of failed range checks in a predefined time window, in particular in a predefined sliding time window. The count value may be decreased periodically or reset periodically such that the count value reflects the number of failed range checks with respect to a predefined time window.

In case the count value exceeds the predefined count limit, an interrupt signal and/or an alarm signal may be generated by the comparator logic 230 and issued to the interrupt controller 150 and/or the FCC unit 160 of the data processing system 100 at a stage S200. The interrupt signal and/or the alarm signal may comprise information relating to the current DMA transfer such as information about the source, information about the destination, information about the value interval, and/or information about the count limit. The interrupt signal and/or the alarm signal may be generated based on IRQ parameters and/or alarm parameters comprised in the check range descriptor. The operational flow may commence with one of the aforementioned operations at stages S150 to S170.

In another example of the present application, the count value may be decreased starting from a default count value in response to a failed range check, at the stage S180. The count limit may be an lower count limit, which means that at stage S190, it is determined whether the count value falls below a the predetermined count limit.

In case the count value does not exceed the predefined count limit, the operational flow may commence with one of the aforementioned operations at stages S150 to S170 described above.

I/O peripherals such as those illustrated in FIG. 1 with reference to the exemplary data processing system may be memory-mapped I/O peripherals, which means that memory locations and/or registers thereof are mapped to the address space of the data processing system. Accesses to data stored in the memory locations and/or registers of a memory-mapped I/O peripheral address one or more memory addresses within the memory space of the memory of the data processing system. A portion of the memory space of the memory of the data processing system may be reserved for the I/O peripherals.

Moreover, a memory-mapped I/O peripheral may provide different data via one common memory location. Access to the different data provided via the common memory location is further specified by a channel information supplementing to address of the common memory location. In the context of the present application, a source or destination address may be understood as a combination of the source or destination address and a further channel identifier.

Furthermore, those skilled in the art will understand from the above description that the range checking may be specified for a predefined channel. For instance, range information, the count value and/or the count limit is defined for a predefined channel of a specific source. A range check descriptor comprising the range information, the count value and/or the count limit may be associated with the transfer descriptor and the current DMA transfer, respectively, based on the source and the channel, from which the source data is read. A transfer descriptor may be associated with several range check descriptors each for a predefined channel of a specific common source. Alternatively, a range check descriptor may comprise one or more sets of range information, the count value and/or the count limit, each set being associated with a predefined channel of a specific common source.

The aforementioned failed range check actions are selectively performed dependent on the control parameters and values of the range check. The range check descriptor may comprise individual parameter and value settings, in response to which one or more failed range check actions are selectively operated.

In further examples of the present application, the comparator logic block 230 is configured to analyze a source value determined to be invalid. On the basis of the analysis, conclusions may be drawn regarding the cause of the source value being outside the range of permissible values or countermeasures to be taken in response to a failed range check. The analysis of invalid source values includes a classification of the invalid source values with regard to predefined domains of invalid values. Each domain comprises a distinct range of invalid values. In the following, a domain comprising a value range of values considered as invalid source values (with regard to the value range of permissible (source) values) will be also denoted as invalid value domain. The domain of invalid values may be defined on the basis of at least one an upper limit and a lower limit.

For the sake of domain analysis, the number of invalid source values is counted with respect to each invalid domain. Examples of such domain analysis will be presented in the following with reference to FIGS. 8 and 9.

Figure 8:
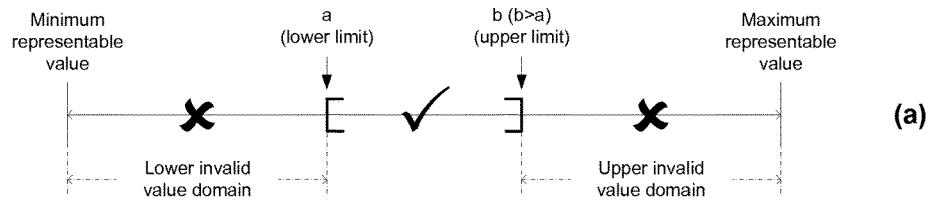
FIG. 8 schematically illustrates a flow diagram relating to a two domain analysis at the direct memory access, DMA, controller of FIG. 2 according to an example of the present invention.
Figure 8:
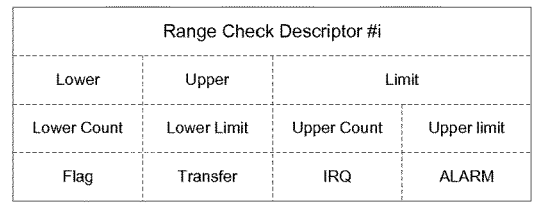
Figure 8:
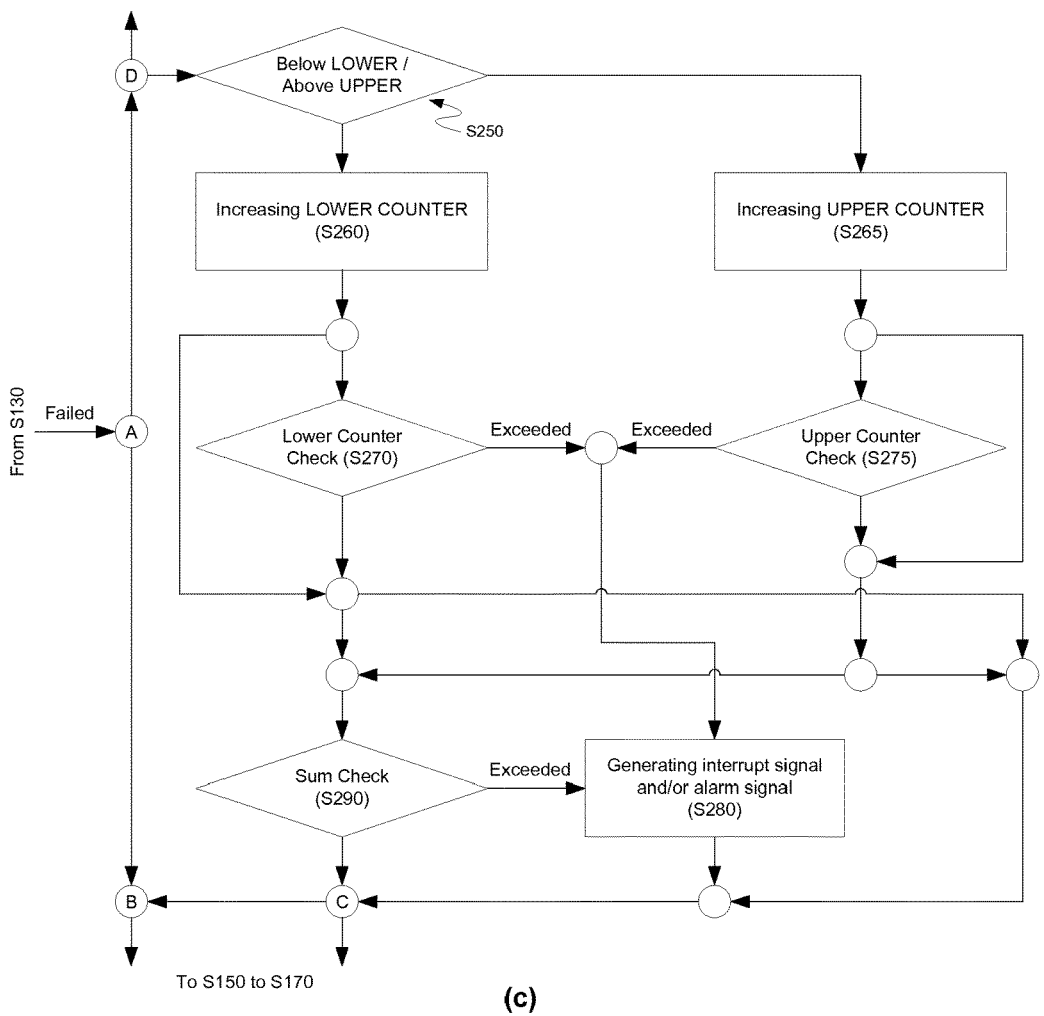

Referring now to FIG. 8, an example of a domain analysis with two invalid value domains according to an example of the present application is schematically shown. As exemplified in depiction (a) of FIG. 8, the two domain of invalid values comprises a first "lower" invalid value domain including all values lower than the lower limit of the range of permissible values and the second "upper" invalid value domain including all values higher that the lower limit of the range of permissible values.

The numbers of invalid source values being within one of the lower invalid value domain and upper invalid value domain are individually counted. A range check descriptor exemplified with reference to depiction (b) of FIG. 8 may comprise individual count values for each of the lower (first) invalid value domain and upper (second) invalid value domain. Moreover, individual count limit values may be further defined for each count value of the respective invalid value domain. Furthermore, a limit value may be comprises, which relates to the total number of invalid source values.

The flow diagram shown in FIG. 7 described above with reference thereto may be extended with the flow diagram shown in depiction (c) of FIG. 8, which schematically illustrates domain analysis operations performed at a comparator logic block 230 according to an example of the present application.

In response to a failed range check, it is determined at a stage S250, within which one of the lower and the upper invalid value domains the invalid source value is. As exemplified, it is determined whether the invalid source value is smaller than the lower limit of the range of permissible values. Alternatively, it may be determined whether the invalid source value is higher than the upper limit of the range of permissible values in order to classify the invalid source value and associate the invalid source value to one of the lower and the upper invalid value domains.

In case the invalid source value is within the lower invalid value domain, a lower domain count value is increased (or decreased) at a stage S260. Otherwise, in case the invalid source value is within the upper invalid value domain, an upper domain count value is increased (or decreased) at a stage S265.

The lower domain count value reflects a lower domain counter relating to the number of failed range checks with respect to DMA transfers from the specific source and/or to the specific destination, the invalid source values of which DMA transfers are within the lower invalid value domain. The upper domain count value reflects an upper domain counter relating to the number of failed range checks with respect to DMA transfers from the specific source and/or to the specific destination, the invalid source values of which DMA transfers are within the upper invalid value domain.

At a stage S270, it is determined whether the lower domain count value exceeds a predefined lower domain count limit value. The lower domain count limit value is associated with the lower invalid value domain. In particular, the lower count limit is associated with the source and/or destination of the current DMA transfer. More particularly, the lower count limit may be comprised in the check range descriptor associated with the transfer descriptor of the current DMA transfer.

At a stage S275, it is determined whether the upper domain count value exceeds a predefined upper domain count limit value. The upper domain count limit value is associated with upper invalid value domain. In particular, the upper count limit is associated with the source and/or destination of the current DMA transfer. More particularly, the upper count limit may be comprised in the check range descriptor associated with the transfer descriptor of the current DMA transfer.

In response to one of the lower and upper count values exceeding the respective one of a lower count limit and an upper count limit, an interrupt signal and/or an alarm signal may be generated by the comparator logic 230 and issued to the interrupt controller 150 and/or the FCC unit 160 of the data processing system 100 at a stage S280. The interrupt signal and/or the alarm signal may comprise information relating to the current DMA transfer such as information about the source, information about the destination, information about the value interval, and/or information about the count limit. The interrupt signal and/or the alarm signal may be generated based on IRQ parameters and/or alarm parameters comprised in the check range descriptor. The operational flow may commence with stage S290 or one of the aforementioned operations at stages S150 to S170.

At a stage S290, it may be determined whether a sum value of the lower and upper count values exceed a total limit value. The sum value of the lower and upper count values reflects a counter relating to the number of failed range checks with respect to DMA transfers from the specific source and/or to the specific destination. In response to the sum value exceeding a predefined total count limit, an interrupt signal and/or an alarm signal may be generated by the comparator logic 230 and issued to the interrupt controller 150 and/or the FCC unit 160 of the data processing system 100 at a stage S280.

The operational flow may commence with one of the aforementioned operations at stages S150 to S170.

Further flow sequences of operational stages representing examples of the present application can be obtained from the flow diagram illustrated in FIG. 8.

Figure 9:
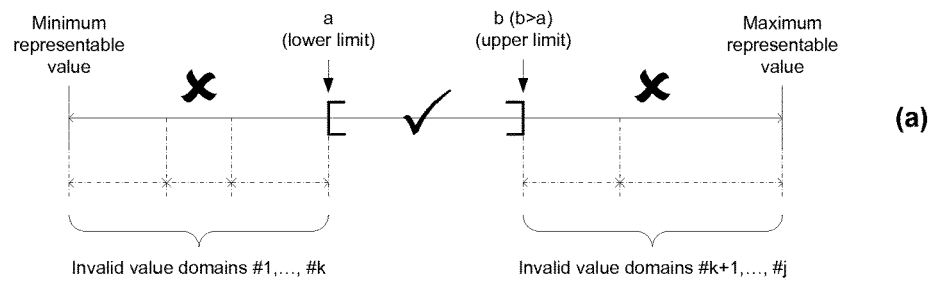
FIG. 9 schematically illustrates another flow diagram relating to a several domain analysis at the direct memory access, DMA, controller of FIG. 2 according to an example of the present invention.
Figure 9:
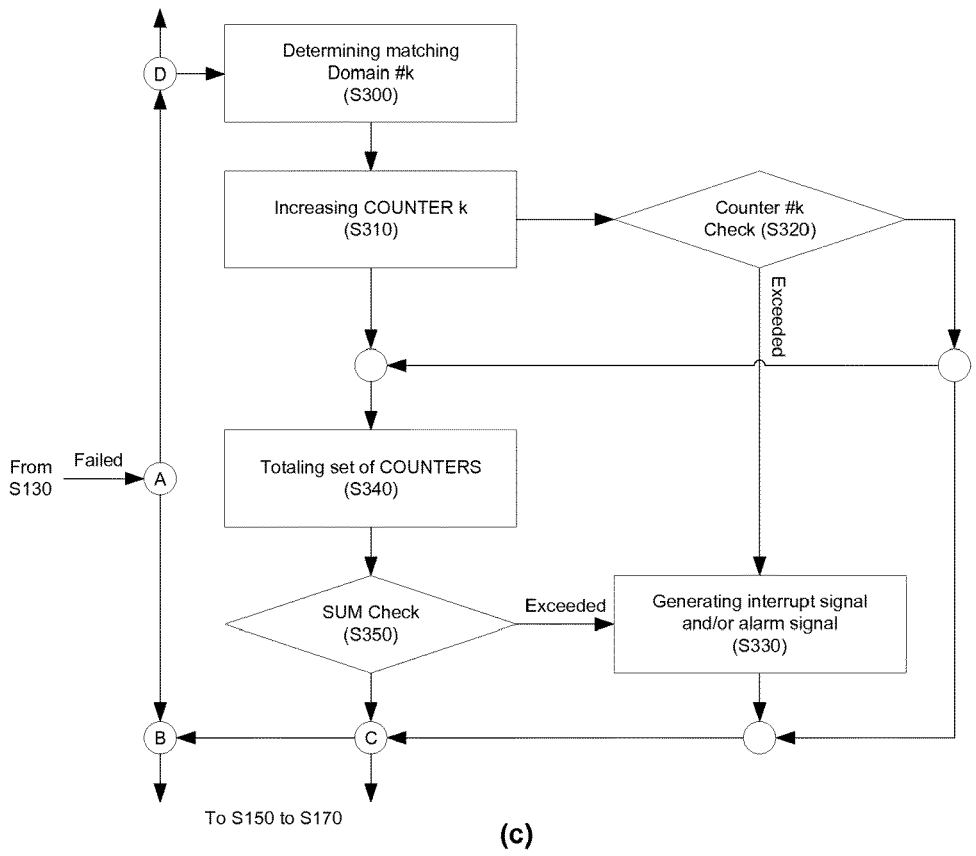

Referring now to FIG. 9, an example of a domain analysis with several invalid value domains according to an example of the present application is schematically shown.

As exemplified in depiction (a) of FIG. 9, the impermissible values with respect to the range check may be associated to one respective invalid value domain. In particular, each impermissible value or invalid source value is associated to one of a plurality of j invalid value domains. As further exemplified in depiction (b) of FIG. 9, at least one of an upper domain limit and a lower domain limit of each invalid value domain is comprised in a check range descriptor together with respective count values and/or count limit values of each invalid value domain. Furthermore, a set limit value may be comprises, which relates to a total count values of the count values of a predefined set of invalid value domains. The predefined set of invalid value domains may comprise all invalid value domains. For each count limit value individual IRQ parameters and/or alarm parameters may be further defined in the check range descriptor.

The flow diagram shown in FIG. 7 described above with reference thereto may be extended with the flow diagram shown in depiction (c) of FIG. 9, which schematically illustrates domain analysis operations performed at a comparator logic block 230 according to an example of the present application.

In response to a failed range check, the matching invalid value domain D(#k) is determined at a stage S300, within which the invalid source value is.

At a stage S310, the count k value, which is associated with the determined invalid value domain #k is increased (or decreased). The count value k reflects a counter relating to the number of failed range checks with respect to DMA transfers from the specific source and/or to the specific destination, the invalid source values of which DMA transfers are within the invalid value domain #k.

At a stage S320, it is determined whether the count C(#k) value exceeds a predefined count limit L(#k) value. The count k limit value is associated with the invalid value domain D(#k). In particular, the count limit L(#k) value is associated with the source and/or destination of the current DMA transfer. More particularly, the count limit L(#k) value may be comprised in the check range descriptor associated with the transfer descriptor of the current DMA transfer.

In response to the count C(#k) value exceeding the respective count limit L(#k) value, an interrupt signal and/or an alarm signal may be generated by the comparator logic 230 and issued to the interrupt controller 150 and/or the FCC unit 160 of the data processing system 100 at a stage S330. The interrupt signal and/or the alarm signal may comprise information relating to the current DMA transfer such as information about the source, information about the destination, information about the value interval, and/or information about the count limit. The interrupt signal and/or the alarm signal may be generated based on IRQ parameters and/or alarm parameters comprised in the check range descriptor. The check range descriptor may comprise individual IRQ parameters and/or alarm parameters for the invalid value domains D(1, . . . , #j). The operational flow may commence with stage S340 or one of the aforementioned operations at stages S150 to S170.

At a stage S230, whether a sum value of a set of count values associated with a predefined set of invalid value domains is determined. The set of count values may comprise the count values of all invalid value domains. The set of invalid value domains may be defined in the range check descriptor.

At a stage S340, it may be determined whether the sum value exceed a total limit value. The sum value may reflect the number of all failed range checks with respect to DMA transfers from the specific source and/or to the specific destination. In response to the sum value exceeding a predefined total limit value, an interrupt signal and/or an alarm signal may be generated by the comparator logic 230 and issued to the interrupt controller 150 and/or the FCC unit 160 of the data processing system 100 at a stage S330. The check range descriptor may comprise individual IRQ parameters and/or alarm parameters for the predefined set of invalid value domains.

The operational flow may commence with one of the aforementioned operations at stages S150 to S170.

Further flow sequences of operational stages representing examples of the present application can be obtained from the flow diagram illustrated in FIG. 9.

In the above description, DMA controllers 200 and the functionality thereof according to examples of the present application are described. Each DMA transfer performed by a DMA controller 200 according to an example of the present invention comprises a temporal sequence of phases, the read phase, the check phase and the write phase. In the read phase, the source data is fetched by the DMA controller 200 from the source. In the check phase, the range check is performed to validate the value of the data received from the source and to perform one or more failed range check actions in response to the result of the range check validation. In the write phase, data is written by the DMA controller 200 to the destination. The data may be the source data or flagged source data. The write phase may be omitted dependent on the result of the range check validation.

In case of a successfully passed range check, the DMA transfer comprises the three consecutive phases: read phase, check phase and write phase.

Those skilled in the art understand that the above exemplified DMA controller 200 described to operate DMA transfers consecutively may comprise two or more independent DMA engines each having the functionality of the above described DMA controller 200. Further, the above exemplified DMA controller 200 may have a channel logic, which enables independent DMA transfers over several DMA channels. Moreover, a data processing system such as the data processing system 100 described above with reference to FIG. 1 may comprise a plurality of DMA controllers and in particular two or more DMA controller 200.

Figure 10:
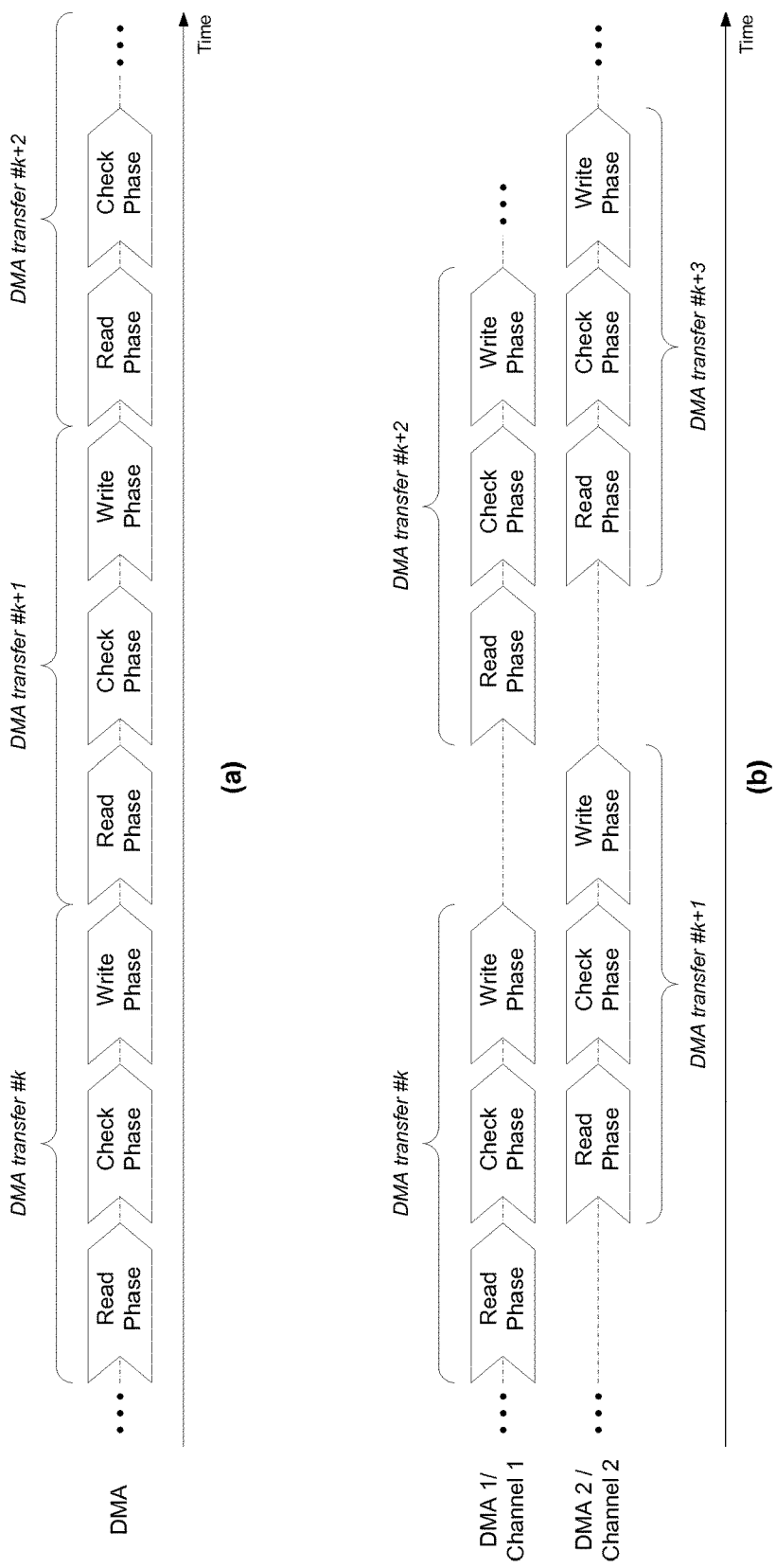
FIG. 10 schematically illustrates time sequence diagrams of the phases of DMA transfers performed by direct memory access, DMA, controllers according to examples of the present invention.

Referring now to depiction (a) of FIG. 10, a schematic diagram is shown illustrating the time sequence of the phases of DMA transfers according to an example of the present application. In particular, the depiction (a) of FIG. 10 illustrates the time sequence of the phases of consecutive DMA transfers #k to #k+2 performed by a DMA controller 200 capable of performing only one DMA transfer at the same time.

The time sequences each comprising read, check and write phases follow on each other in consecutive order. Each DMA transfer is completed before the next DMA transfer is performed.

Referring now to depiction (b) of FIG. 10, a schematic diagram is shown illustrating the time sequence of the phases of DMA transfers performed by two independent DMA engines/channels according to an example of the present application. In particular, the depiction (a) of FIG. 10 illustrates the time sequence of the phases of consecutive DMA transfers #k to #k+2 performed by two independent DMA controllers 200, two independent DMA engines at a DMA controller 200 or via two independent channels of a DMA controller 200.

The read phase of one DMA transfer #k+1 or #k+3 is performed whereas the check phase of another DMA transfer #k or #k+2 is performed at the same time. Hence, two DMA transfers are performed simultaneously by shifted in time by one phase such that conflicting accesses to the system bus 170 are avoided. Hence, two DMA transfers are performable at 1% DMA transfer periods. According to an example of the present application, a direct memory access, DMA, controller 200 for a data processing system 100 is provided. The DMA controller 200 comprises a transfer table 250, a data path processing block 220 and a comparator logic block 250. The table 250 comprises at least one transfer descriptor, each of which comprises information about a source and destination of a DMA transfer within the data processing system 100. The data path processing block 220 is provided to be coupled to a system interconnect 170 of the data processing system 100 and configured to receive data from the source of the DMA transfer and to transfer the received data to the destination of the DMA transfer. The comparator logic block 250 is arranged with the data path processing block 220. The comparator logic block 250 is configured to validate the value of the received data against a predefined value range for range checking and to initiate one or more failed range check actions in response to a failed range checking.

According to an example of the present application, the one or more actions comprise at least one of cancelling the DMA transfer, adding a flag to the received data, counting the failed range check validation with reference to at least one of the source and the destination of the DMA transfer and domain classification of the value of the received data against several invalid value domains with non-overlapping value ranges.

According to an example of the present application, the predefined value range is defined on the basis of at least one of an upper limit and a lower limit.

According to an example of the present application, wherein the predefined value range is comprised in the transfer descriptor.

According to an example of the present application, the memory access, DMA, controller 200 further comprises a range check table. The range check table comprises at least one range check descriptor, which comprises information about the predefined value range. The transfer descriptor is associated with the range check descriptor.

According to an example of the present application, the range check table is configured to maintain the at least one range check descriptor for several DMA transfers separated in time. Each several DMA transfers is performed in accordance with a respective transfer descriptor. Each transfer descriptor for controlling the respective DMA transfer is associated with the range check descriptor.

According to an example of the present application, the transfer descriptor is associated with the range check descriptor via one of a link and a common information.

In the first case, the transfer descriptor comprises one or more links to one or more check range descriptors. In the latter case, the common information is comprised in the transfer descriptor and in the range check descriptor. The range check descriptor associated with the transfer descriptor of the DMA transfer is identifiable on the basis of the common information.

According to an example of the present application, the predefined value range is defined on the basis of at least one of an upper limit and a lower limit. The comparator logic block 250 is configured to compare the value of the received data with the at least one of the upper limit and the lower limit of the predefined value range for range checking.

According to an example of the present application, the comparator logic block 250 is configured to count the number of failed range check validations by a count value associated with at least one of the source and the destination of the DMA transfer. The count value may be a down-counting value or an up-counting value.

According to an example of the present application, the comparator logic block 250 is configured to compare the count value with a count limit. The count limit is associated with at least one of the source and the destination of the DMA transfer.

According to an example of the present application, the comparator logic block 250 is configured to issue at least one of an interrupt signal and an alarm signal in response to the count value meeting the count limit. In case of an up-counting value, the count limit is an upper count limit and in case of a down-counting value, the count limit is a lower count limit.

According to an example of the present application, the range check descriptor further includes the count value and/or the count limit.

According to an example of the present application, the comparator logic block 250 is configured to cancel the DMA transfer in response to the failed range check validation.

According to an example of the present application, the comparator logic block 250 is configured to include a flag into the received data in response to the failed range check validation.

According to an example of the present application, the comparator logic block is configured to compare the value of the received data against at least two predefined domains for domain classification in response to the failed range check validation. The domain classification is applied to determine within which of the at least two domains the value of the received data is. The at least two domains are invalid value domains. The at least two predefined domains comprise a total value range except the predefined value range and comprise distinct value ranges. The total value range is defined by the representation and the data size (number of bits) used for the source data.

According to an example of the present application, the range check descriptor further comprises information, on the basis of which the at least two domains are defined. The information about a domain may comprise at least one of a lower domain limit and an upper domain limit.

According to an example of the present application, the comparator logic block is further configured to count the number of successful domain classifications by a domain count value associated with the determined domain resulting from the domain classification.

According to an example of the present application, the comparator logic block is further configured to compare the domain count value with a domain count limit and to issue at least one of an interrupt signal and an alarm signal in response to the domain count value meeting the domain count limit. The domain count limit is associated with the determined domain resulting from the domain comparison.

The range check descriptor may further comprise the domain count value and/or a domain count limit for one or more of the at least two domains.

According to an example of the present application, the controller further comprises an address path processing block 210 provided to be coupled to the system interconnect 170 of the data processing system 100 and configured to generate source and destination addresses based on the transfer descriptor of the DMA transfer.

According to an example of the present application, transfer descriptor comprises information, on the basis of which a source address and a destination address with respect to the memory address space of the data processing system 100 is determinable by the address path processing block.

According to an example of the present application, the source information relates to a data location of a memory-mapped I/O peripheral 130.

According to an example of the present application, the source information relates to and allows to specify a predefined channel of a data location of a memory-mapped I/O peripheral 130.

According to an example of the present application, a data processing system 100 is provided, which comprise at least one processor core 110, a memory 140, a peripheral 120, 130, a direct memory access, DMA, controller 200, and a system interconnect 170. The at least one processor core 110, the memory 140, the peripheral 120, 130 and the direct memory access, DMA, controller 200 are coupled to the system interconnect 170 for data commination between them. The direct memory access, DMA, controller is a direct memory access, DMA, controller 200 according to an example of the present application.

According to an example of the present application, the data processing system is a system-on-chip, SoC, or a system-on-package, SiP.

According to an example of the present application, the peripheral 120, 130 is an I/O peripheral 130. In particular, the I/O peripheral 130 is a memory-mapped I/O peripheral 130.

According to an example of the present application, the data processing system 100 further comprises at least one of an interrupt controller 150 and a failure collection and correction, FCC, unit 160. The interrupt controller 150 is coupled to the at least one processor core 110 and the direct memory access, DMA, controller 200 to receive an interrupt signal in response to the failed range check validation. The failure collection and correction, FCC, unit 160 is coupled to the direct memory access, DMA, controller 200 to receive an alarm signal in response to the failed range check validation.

According to an example of the present application, a method of operating a direct memory access, DMA, controller is provided. The direct memory access, DMA, controller 200 is configured to operate a DMA transfer within a data processing system for a source to a destination. Data from the source of the DMA transfer is received at a data path processing block 220 of the direct memory access, DMA, controller 200. The DMA transfer is controlled on the basis of at least one transfer descriptor in a transfer table 250. The at least one transfer descriptor includes information about the source and the destination of the DMA transfer. The value of the received data is validated against a predefined value range, which may be comprised in the check range descriptor, for range checking at a comparator logic block 250, which is arranged with the data path processing block 220. One or more failed range check actions are triggered and/or is initiated in response to a failed range check validation. The received data is transferred to the destination of the DMA transfer in response to a passed range check validation.

The processing system 100 may, for example, be a safety critical system or may be comprised in a safety critical system. A safety critical system may, for example, be an automotive safety critical system, where possible malfunction or wrong usage may endanger, for example, a user of the system, e.g. a car driver. A safety critical system may, for example, be part of electronic equipment of a power plant or a self-propelled vehicle, such as a car, truck, plane, ship, helicopter, etc. An automotive safety critical system, may, for example, comprise an engine control unit (ECU). An automotive safety critical system may, for example, be a car safety system. A safety critical system may comprise a seat position control system, lighting, airbags, windscreen wipers, immobilizers, electronic climate control, a brake system or an electrical steering system. A brake system may comprise, for example, an anti-lock braking system (ABS), an electronic brake force distribution system (EBD), a cornering brake control (CBC) system etc. An electrical steering system may comprise, for example, an electronic stability control system (ESC), a traction control system (TCS) or anti-slip regulation system (ASR), an adaptive cruise control (ACC) system, a forward collision warning (FCW) system etc.

However, those skilled in the art will understand from the above description that the DMA controller 200 according to an example of the present application is not limited to safety critical system but may be used in any data processing systems and in particular in data processing systems processing data generated from an external signal and/or inputted from external.

In the foregoing specification, the invention has been described with reference to specific examples of embodiments of the invention. It will, however, be evident that various modifications and changes may be made therein without departing from the broader spirit and scope of the invention as set forth in the appended claims. The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connections that transfers multiple signals serially or in a time multiplexed manner. Likewise, single connections carrying multiple signals may be separated out into various different connections carrying subsets of these signals. Therefore, many options exist for transferring signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the DMA controller 200 and the comparator 250 may be implemented as a single device or in separate devices.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, the processing system 50 may be as a single integrated circuit, and e.g. be implemented as a system-on-a-chip or a system in a package, which may, for example, be a microcontroller unit (MCU). Alternatively, the example may be implemented as any number of separate integrated circuits or separate devices interconnected with each other in a suitable manner. For example, direct memory access controller 200 and the one or more further components of the data processing system 100 may be implemented as separate integrated circuits connected to each other in a suitable manner, e.g. through a printed circuit board.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word "comprising" does not exclude the presence of other elements or steps then those listed in a claim. Furthermore, the terms "a" or "an", as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an". The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To illustrate clearly this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. An enhanced direct memory access (DMA) controller for a data processing system, the controller comprising:
    a transfer table comprising at least one transfer descriptor including information about a source and a destination of a DMA transfer within the data processing system;
    a data path processing block provided to be coupled to a system interconnect of the data processing system and configured to receive data from the source of the DMA transfer and to transfer the received data to the destination of the DMA transfer; and
    a hardware comparator logic block arranged with the data path processing block and configured to validate the received data against a predefined value range for range checking and to initiate one or more actions in response to a failed range checking.

2. The DMA controller according to claim 1, wherein the one or more actions comprise at least one of cancelling the DMA transfer, adding a flag to the received data, counting the failed range check validation with reference to at least one of the source and the destination of the DMA transfer, and domain classification of the received data against invalid value domains.

3. The DMA controller according to claim 1, wherein the predefined value range is comprised in a range check descriptor.

4. The DMA controller according to claim 3, wherein the range check descriptor is part of the transfer descriptor.

5. The DMA controller according to claim 3, further comprising:
    a range check table comprising at least one range check descriptor including information about the predefined value range, wherein the transfer descriptor is associated with the range check descriptor.

6. The DMA controller according to claim 5, wherein the range check table is configured to maintain the at least one range check descriptor for several DMA transfers separated in time in accordance with respective transfer descriptors, each of which is associated with the range check descriptor.

7. The DMA controller according to claim 6, wherein the transfer descriptor is associated with the range check descriptor via one of
    a link, wherein the transfer descriptor comprises one or more links to one or more check range descriptors, and
    a common information, which is comprised in the transfer descriptor and in the range check descriptor and on a basis of which the range check descriptor associated with the transfer descriptor of the DMA transfer is identifiable.

8. The DMA controller according to claim 1,
    wherein the predefined value range is defined on a basis of at least one of an upper limit and a lower limit, and
    wherein the hardware comparator logic block is configured to compare the received data with the at least one of the upper limit and the lower limit for range checking.

9. The DMA controller according to claim 1, wherein the hardware comparator logic block is configured to count the number of failed range check validations by a count value associated with at least one of the source and destination of the DMA transfer.

10. The DMA controller according to claim 9, wherein the hardware comparator logic block is configured
    to compare the count value with a count limit, and
    to issue at least one of an interrupt signal and an alarm signal in response to the count value meeting the count limit; and
    the count limit is associated with at least one of the source and destination of the DMA transfer.

11. The DMA controller according to claim 10, wherein the range check descriptor further comprises the count value and the count limit.

12. The DMA controller according to claim 1, wherein the hardware comparator logic block is configured to cancel the DMA transfer in response to the failed range check validation.

13. The DMA controller according to claim 1, wherein the hardware comparator logic block is configured to include a flag into the received data in response to the failed range check validation.

14. The DMA controller according to claim 1, wherein
the hardware comparator logic block is configured to compare the received data against at least two predefined domains for domain classification in response to the failed range check validation to determine within which domain the value of the received data is, and
the at least two predefined domains comprise a total value range except the predefined value range and comprise distinct value ranges.

15. The DMA controller according to claim 14, wherein the hardware comparator logic block is further configured to count the number of successful domain classifications by a domain count value associated with the determined domain resulting from the domain classification.

16. The DMA controller according to claim 15, wherein the hardware comparator logic block is further configured to
compare the domain count value with a domain count limit, and
issue at least one of an interrupt signal and an alarm signal in response to the domain count value meeting the domain count limit, wherein the domain count limit is associated with the determined domain resulting from the domain comparison.

17. A data processing system, comprising:
at least one processor core;
a memory;
a peripheral;
a direct memory access, DMA controller; and
a system interconnect, to which the at least one processor core, the memory, the peripheral and the DMA controller are coupled for data commination between them,
wherein the DMA controller is an enhanced DMA controller according to claim 1.

18. The data processing system according to claim 17, wherein
the data processing system is a system-on-chip, SoC, or a system-on-package, SiP.

19. The data processing system according to claim 17, further comprising at least one of:
an interrupt controller coupled to the at least one processor core and the DMA controller to receive an interrupt signal in response to the failed range check validation; and
a failure collection and correction, FCC, unit coupled to the DMA controller to receive an alarm signal in response to the failed range check validation.

20. A method of operating an enhanced direct memory access (DMA) controller configured to operate a DMA transfer within a data processing system for a source to a destination, the method comprising:
receiving data from the source of the DMA transfer at a data path processing block of the DMA controller,
wherein the DMA transfer is controlled on a basis of at least one transfer descriptor provided in a transfer table, wherein the at least one transfer descriptor comprises information about the source and the destination of the DMA transfer;
validating the received data against a value range for range checking at a hardware comparator logic block arranged with the data path processing block;
initiating at least one range check failed action in response to a failed range check validation; and
transferring the received data to the destination of the DMA transfer in response to a passed range check validation.

* * * * *